Oct. 21, 1958     E. C. BRISBANE     2,857,130
VALVES

Filed June 6, 1955     4 Sheets-Sheet 1

INVENTOR.
Eugene C. Brisbane

Oct. 21, 1958 E. C. BRISBANE 2,857,130
VALVES
Filed June 6, 1955 4 Sheets-Sheet 3

INVENTOR.
Eugene C. Brisbane

United States Patent Office 2,857,130
Patented Oct. 21, 1958

2,857,130

VALVES

Eugene C. Brisbane, Birmingham, Ala.

Application June 6, 1955, Serial No. 513,184

4 Claims. (Cl. 251—175)

This invention relates to valves, and more particularly to valves of the type having a rotatable plug or gate for controlling the flow of fluid.

An object of the invention is to provide a new and improved construction for a valve of the above type in which the rotatable gate has a movable member operable by variations in fluid pressure within the valve for sealing the joint between the gate and the valve body when the gate is in closed position.

Another object of the invention is to provide a new and improved mounting for the movable sealing member of the valve gate which permits the gate to be quickly and easily operated with a minimum of effort.

A further object of the invention is to provide an improved valve of the character mentioned, which is simple in construction, and reliable and exact in function under all conditions of service.

The invention also comprises certain new and useful improvements in the construction, arrangement and combination of the several parts of which it is composed, as will be hereinafter more fully described and claimed.

Figure 1:
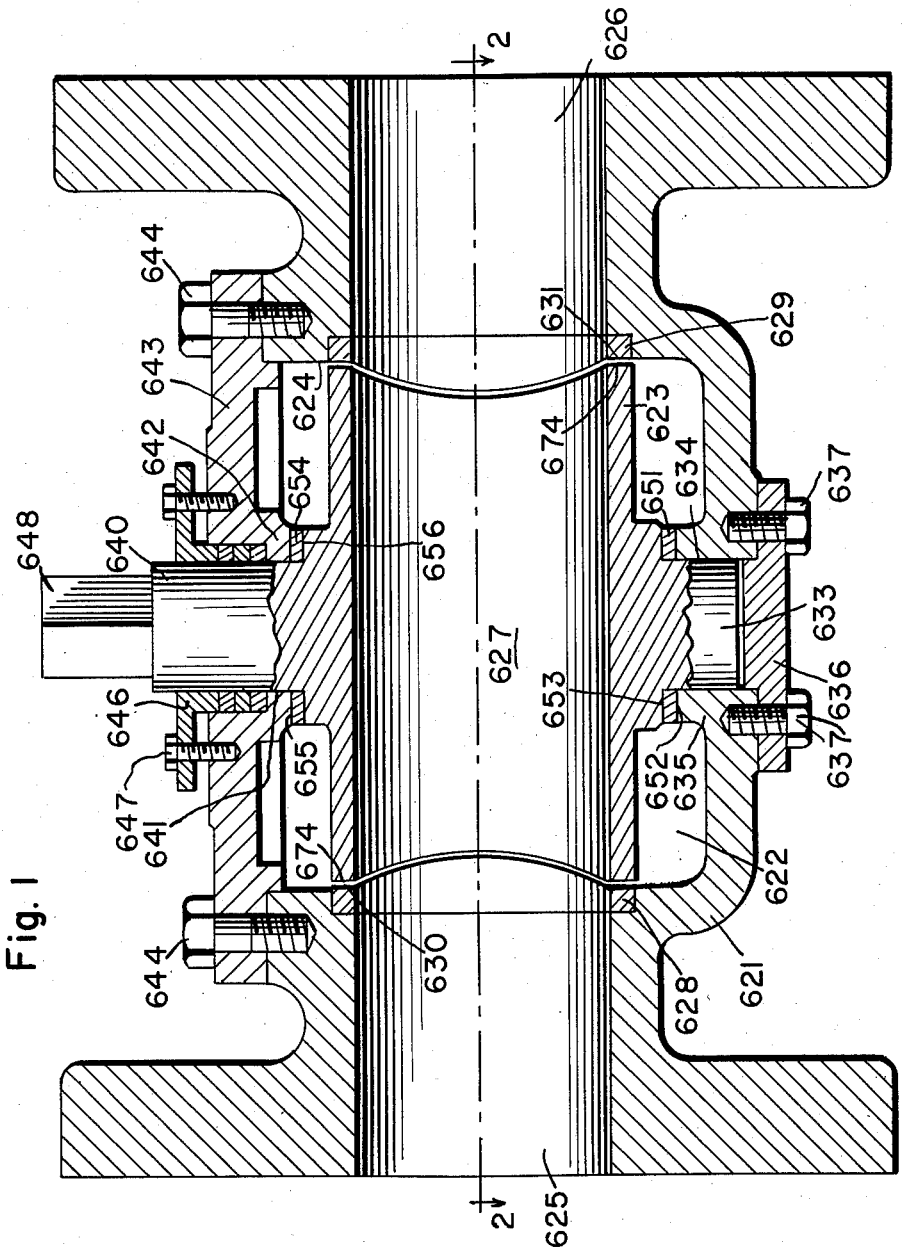
Fig. 1 is a vertical longitudinal sectional view of a valve constructed according to the present invention, the rotatable gate of the valve being shown in open position.

The drawings illustrate a straight-way valve, but the improvements are equally applicable to three or four-way, elbow and angle valves.

Referring to the drawings, the improved valve comprises a main body or casing 621 having an internal cylindrical chamber or cavity 622 for a rotatable gate 623. Thus, the improvements are directed to valves of the type in which the valve body cavity has a vertical circular or round side wall 624 substantially concentrically arranged with respect to the axis of rotation of the gate 623.

The cavity 622 is intersected by a longitudinal waterway or opening which constitutes passages 625, 626 through the valve, the passage 625 being on one side of the cavity 622 and the passage 626 being on the other side of said cavity.

The gate also has a pasage 627 formed therein.

The passages 625, 626 and 627 are round, and all are of the same diameter, so that when the gate 623 is in the open position shown in Fig. 1, a uniform bore will extend through the valve from end to end.

At the point where the passage 625 meets the adjacent wall 624 of the cavity 622, a tubular sleeve 628 is mounted in the waterway of the valve body. Likewise, there is a tubular sleeve 629 mounted in the waterway of the valve body at the intersection of the passage 626 with the wall 624 of the cavity 622. The end surfaces 630 and 631 of the sleeves 628 and 629, respectively, are beveled and finished smooth to provide sealing seats. As shown, the sealing seats 630, 631 are disposed within the cavity 622 a slight distance inwardly with respect to the wall 624.

At its lower end the gate 623 is formed with an extension which constitutes a shaft or trunnion 633 rotatably mounted in a bore 634 in a boss 635 formed on the bottom portion of the casing 621. The bottom of the bore 634 is normally closed by means of a cover or plate 636 secured to the casing by means of a plurality of bolts or screws 637.

Projecting upwardly from the top of the gate 623, is a shaft or stem 640, which passes through an opening 641 on a boss 642 formed on a cover plate or cap 643 mounted on the top of the casing 621 and detachably held in position thereon by means of a plurality of screws or bolts 644. The cavity 622 has a diameter greater than the maximum width of the gate 623 and the side wall 624 of said cavity extends upwardly to the top of the casing so that when the cover plate or cap 643 is removed from the valve there will be an opening large enough in area to permit the insertion and removal of the gate 623.

A packing gland 646 surrounds the stem 640 and is detachably secured to the cover plate 643 by screws or bolts 647.

The construction and arrangement of the parts is such that the shafts 633 and 640 are mounted in the valve substantially concentric with respect to the side wall 624 and on the vertical axis of the cavity 622, whereby the gate 623 is adapted to be rotated on an axis at right angles with respect to the longitudinal center line of the waterway through the valve provided by the passages 625, 626 and 627.

In order to maintain the gate 623 in position within the cavity in which the waterway passage 627 will always be in alignment with the waterway passages 625 and 626 of the valve casing 621 when the gate is in open position, and also to prevent rectilinear shifting movements of the gate upwardly and downwardly with respect to the longitudinal center of the valve casing waterway passage, a thrust bearing 651 is mounted on the shaft 633 and is disposed between the upper portion 652 of the boss 635 and the bottom portion 653 of the gate, and a second thrust bearing 654 is mounted on the shaft 640 and is disposed between the lower portion 655 of the boss 642 and the upper portion 656 of the gate.

Projecting outwardly from the body of the gate 623, is an annular or circular wall or rib 661, which may, if so desired, be formed integral with the body of the gate, as shown. The rib stands out a suitable distance from the exterior of the gate body and has a peripheral side wall 662 which provides means for supporting a sealing member 665.

The sealing member 665 comprises an annular ring-like body having an internal wall 666 slidably engageable with the side wall 662 of the rib 661, whereby said sealing member is freely movable outwardly and inwardly on its supporting means provided by said rib.

The outer surface of the sealing member 665 is formed with an arcuate peripheral portion 667 having a contour corresponding substantially with the contour of the sealing seats 630, 631, heretofore described, to provide a seating surface on the sealing member 665 for intimate engagements with the valve sealing seats when the gate is in the closed position.

The outer portion of the sealing member 665 is formed with an inwardly extending flange 668 which extends over the end 669 of the rib 661.

Mounted in the wall of the rib 661 and radially disposed with respect to the sealing member 665, is a plurality of set screws 670.

Each set screw 670 has an outer end portion 671 formed like the frustrum of a cone, and this end of the set screw is mounted in a cavity 672 formed in the body of the sealing member 665 and having a wall 673 inclined at an angle corresponding substantially with the angle of the conical end portion 671 of the set screw. The inner end of each set screw 670 is so disposed within the central open portion of the rib 661 and the sealing member 665 that it is readily accessible for adjustment with a suitable tool.

It will thus be noted that the construction and arrangement of the parts is such that the set screws 670 serve a dual purpose. First, they provide means for holding the sealing member 665 on the gate 623, and second, they tram the sealing member away from the sealing seats 630, 631, to thereby lower the seat bearing pressure and in turn transfer the load to the gate and its bearings.

Figure 3:
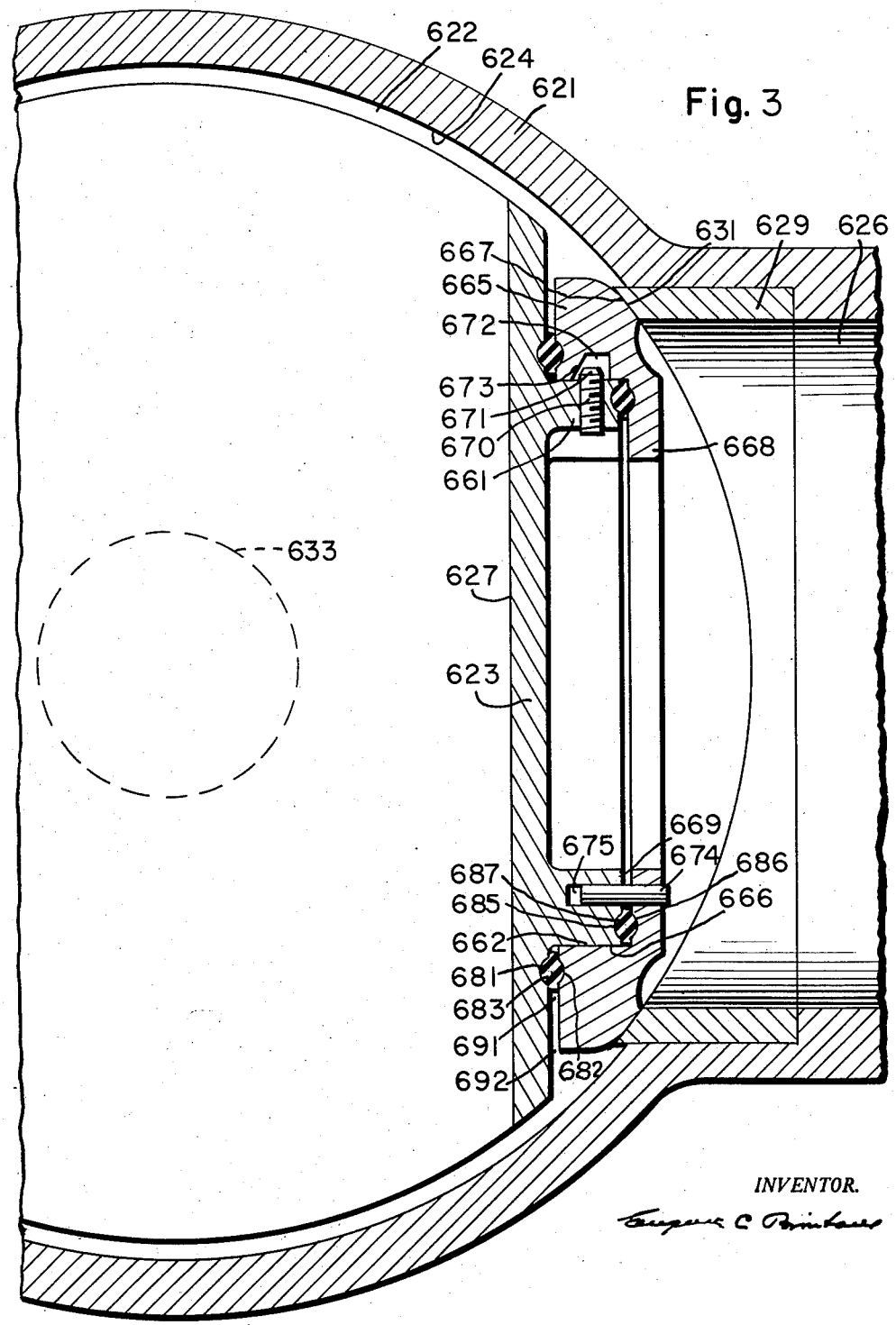
Fig. 3 is a horizontal section of a portion of the valve, showing the rotatable gate in closed position.

In order to prevent the sealing member 665 from rotating around its support provided by the rib 661, a pin 674 carried by the flanged portion 668 of said sealing member is slidably mounted in a hole 675 formed in the rib 661 in the manner shown in Fig. 3. It will be understood that a plurality of pins 674 may be arranged in suitable spaced apart relationship around the sealing member 665.

Formed in the body of the gate 623 and surrounding the rib 661 and spaced outwardly a suitable distance therefrom, is an annular groove 681.

Formed in the body of the sealing member 665 is an annular groove 682 which is arranged opposite to the groove 681.

Figure 2:
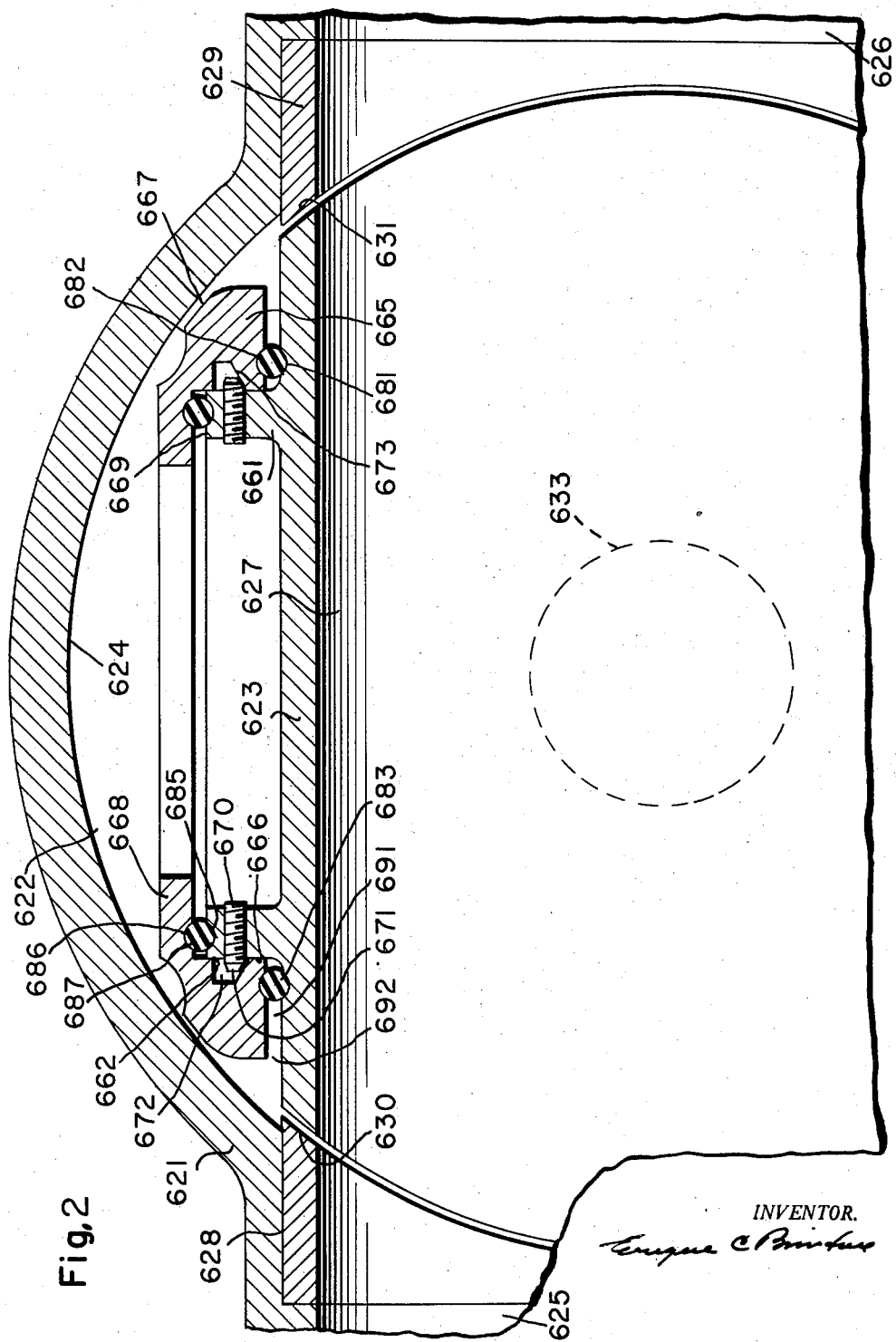
Fig. 2 is an enlarged horizontal section of a portion of the valve, taken along the line 2—2 of Fig. 1.

The grooves 681, 682 face each other to provide channels for supporting a ring 683 of resilient material, such as rubber or other such compressible and expandable composition material. In an unloaded state the body of the ring 683 is substantially round in cross section, as seen in Fig. 2.

Formed in the outer end portion 669 of the rib 661 is an annular groove 685.

Formed in the sealing member 665 adjacent to the junction of the flange 668 with the main body of said sealing member, is an annular groove 686.

The grooves 685, 686 face each other to provide opposed channels for supporting a ring 687 of resilient material, such as rubber or other such compressible and expandable material. In an unloaded state the body of the ring 687 is substantially round in cross section, as seen in Fig. 2.

It will be noted that the two rubber rings 683, 687 are interposed between the body of the gate 623 and the body of the sealing member 665 in such a manner that when the gate is in the open position shown in Fig. 2, the sealing member will be maintained in an extended relationship with respect to the gate, and when the gate is in closed position the sealing member is forced inwardly by the engagement of its sealing surface 667 with the sealing seat 631 of the valve, thereby compressing the rings 683, 687 in the manner shown in Fig. 3. In this way the gate is tightly sealed with the valve body when said gate is in closed position.

The construction and arrangement of the parts is such that a chamber 691 is provided at the back side of the sealing member 665, said chamber being connected to the exterior of the gate by port or passage 692, Fig. 2. With the chamber 691 thus provided, fluid pressure within the valve acts on the sealing member 665 to move said sealing member outwardly with respect to the gate body during rotation of the gate from open to closed position, and this action by fluid pressure supplements the action of the auxiliary operating means provided by the rings 683, 687. Thus, when the gate is turned toward closed position, the sealing member 665 is eased into position to tightly seal the gate 623 with the valve body under fluid pressure, plus the pressure exerted on the sealing member 665 by the rings 683 and 687.

When the valve gate 623 is provided with a pair of diametrically disposed sealing members 665 arranged in the manner above described, means are provided for effectively sealing the joint between the gate and the valve body to cut-off communication through the valve in either direction. Under certain conditions it may be desired to cut-off communication through the valve in only one direction, and in such case the gate 623 may be constructed with a single sealing member 665 mounted at one side of the waterway 627.

Figure 4:
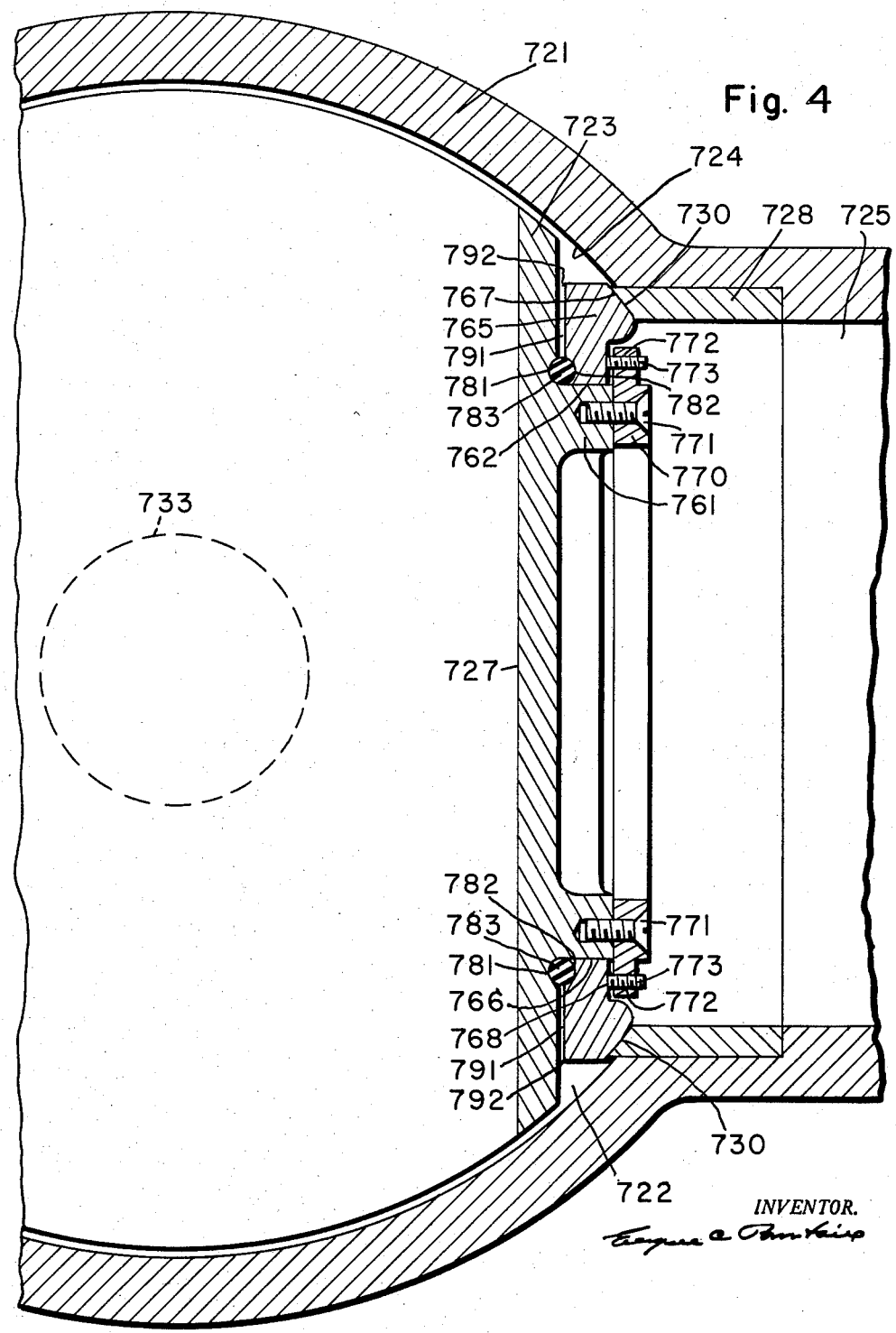
Fig. 4 is a section view similar to Fig. 3 showing another form of the invention.

In the form of the invention shown in Fig. 4, only a portion of the valve is illustrated. It will be understood that the valve body and the rotatable gate mounted therein are constructed symmetrically about the center of the valve body and gate. Thus, while in Fig. 4 only one sealing member is shown on the gate, said gate may be provided with a pair of diametrically disposed sealing members, and the valve body may have a pair of sealing members, one for each sealing member of the gate, these parts being arranged in a manner similar to that heretofore shown and described.

In Fig. 4 the valve body or casing 721 has a cylindrical cavity 722 for a rotatable gate 723.

Leading into the cavity 722 is a longitudinal opening or waterway 725. The gate 723 also has a waterway 727 formed therein.

A tubular sleeve 728 is mounted in the waterway 725 of the valve body. The end portion of the sleeve 728 which terminates at the cavity 722 is disposed within the cavity a slight distance inwardly with respect to the wall 724. This end surface of the sleeve has a beveled and slightly arcuate contour, said end surface being finished smooth to provide a sealing seat 730.

The gate 723 may be rotatably mounted in the valve body in a conventional manner with suitable bearings as has heretofore been described, the lower shaft 733 of the gate being indicated by broken lines.

Projecting outwardly from the body of the gate 723, is an annular or circular wall or rib 761, which may, if so desired, be formed integral with the body of the gate, as shown. The rib 761 stands out a suitable distance from the exterior of the gate body and has a peripheral side wall 762 which provides means for supporting a sealing member 765.

The sealing member 765 comprises an annular ring-like body having an internal wall 766 slidably engageable with the side wall 762 of the rib 761, whereby said sealing member is freely movable outwardly and inwardly on its supporting means provided by said rib.

The outer surface of the sealing member 765 is formed with an arcuate peripheral portion 767 having a contour corresponding substantially with the contour of the sealing seat 730, to provide a seating surface on the sealing member 765 for intimate engagement with the valve sealing seat when the gate is in the closed position shown in Fig. 4.

Adjacent to the sealing surface 767, the outer portion of the sealing member 765 is also formed with a flat surface 768, said surface 768 being arranged substantially at right angles to the wall 766.

Mounted on the outer end of the rib 761, is a ring 770 which is detachably connected to the gate by means of screws 771.

The ring 770 extends outwardly beyond the peripheral side wall 762 of the rib 761 and overlies the portion 768 of the sealing member 765.

Formed in the outer portion of the ring 770 is a plurality of screw threaded openings 772 which extend through the body of said ring.

A set screw 773, mounted in each opening 772, has its inner end disposed in contact with the surface 768 of the sealing member 765. This construction and arrangement of the parts is such that the set screws 773 function as tramming screws to limit outward movements of the sealing member 765 on the support provided by the rib 761. The set screws 773 retain the sealing member 765 from rotating around the rib 761, as will be understood.

Formed in the body of the gate 723 and surrounding the rib 761 is in annular groove 781. Formed in the body of the sealing member 765 is an annular groove 782 which is arranged opposite to the groove 781. The grooves 781, 782 face each other to provide channels for supporting a ring 783 of resilient material, such as rubber or other such compressible and expandable composition material.

The rubber ring 783 is interposed between the body of the gate 723 and the body of the sealing member 765 in such a manner that when the gate is in a position other than the closed position shown in Fig. 4, the sealing member will be maintained in an extended relationship with respect to the gate, since the rubber ring 783 will be expanded. The extended position of the sealing member 765 is limited by the engagement of the surface 768 thereof with the inner ends of the set screws 773. When the gate is in the closed position, the sealing member 765 is forced inwardly by the engagement of its sealing surface 767 with the sealing seat 730 of the valve. In this way the gate is tightly sealed with the valve body when the gate is in closed position.

The construction and arrangement of the parts is such that a fluid pressure zone or chamber 791 is provided at the back side of the sealing member 765, said chamber being connected to the exterior of the gate by port or passage 792. With fluid pressure zone or chamber 791 thus provided in the valve, fluid pressure acts on the sealing member 765 in the manner hereinbefore described to move said sealing member outwardly with respect to the gate body during rotation of the gate within the valve body, and this action by fluid pressure supplements the action of the auxiliary operating means provided by the ring 783. It will be understood that the operation of this form of the invention is substantially similar to the operation of the valve heretofore described.

During rotation of the gate 723 toward closed position, the instant the gate is closed, fluid pressure in the pressure zone or chamber 791, forces the sealing member 765 tightly against the body seat 730, due to the area differential. The purpose of the ring 783 is to provide additional means for moving the sealing member 765 toward the body seat 730 to insure a metal to metal contact so that fluid pressure can build up internally of the valve.

When the parts of the valve of the construction shown in Fig. 4 are being assembled, with the gate 723 in the closed position shown, and the tramming screws 773 loose with respect to the sealing member 765, fluid pressure is applied internally of the valve. This fluid pressure preferably should be approximately 250 p. s. i., which is the maximum pressure it is desirable tto apply to the sealing member 765. However, the amount of torque required to open or close the gate 723 with this amount of fluid pressure within the valve would be extremely high, because of the great pressure of the sealing member seat against the body seat 730. Consequently, after fluid pressure has been applied internally of the valve, the tramming screws 773 are turned inwardly into contact with the surface 768 of the sealing member 765. The tramming screws 773 are turned inwardly an amount sufficient to unseat the sealing member 765 from the valve body seat 730 an amount in which leakage occurs through the joint between the sealing member and the valve body seat 730. The tramming screws 773 are then backed off just enough to permit the sealing member to seat against the valve body seat 730. In this way the bearing pressure of the sealing member 765 against the body seat 730 is at a minimum to prevent leakage of fluid through the joint therebetween. Consequently, the amount of force required to rotate the gate 723 from closed position toward open position is very little, due to the minimum amount of pressure required to seat the sealing member 765 against the body seat 730, as will be understood.

It will be noted that the present invention provides means on the valve gate and accessible through the valve passage when the valve gate is in passage closing position for lowering the seat bearing pressure of said valve gate sealing means so that the valve gate sealing means can seat against the valve sealing seat an amount sufficient to prevent leakage of fluid through the joint between the valve gate sealing means and the valve sealing seat and thereby transfer the load to the valve gate and the bearings.

While I have described the invention in great detail and with respect to the present preferred form thereof, it is not desired to be limited thereto, since changes may be made therein without departing from the spirit and scope of the invention as defined by the following claims.

Having thus described my invention, what is claimed is:

1. A valve of the character described comprising a casing having a cavity therein, a waterway extending through the casing and intersecting the cavity, a sealing seat at the inner end of the waterway at the intersection of the waterway with the cavity, a gate within the cavity for controlling communication through the valve, said gate having upper and lower shafts mounted in bearing in the valve whereby said gate is rotatable on an axis at right angles with respect to the waterway of said valve casing, a movable sealing member mounted on said gate and having a sealing surface for engagement with the valve casing sealing seat when the gate is rotated to position the movable sealing member in registration with the inner end of the valve casing waterway, means operable by variations in fluid pressure within the valve for moving the gate sealing member outwardly with respect to the gate and into tight seating engagement with the sealing seat at the inner end of the valve waterway, and means for lowering the seat bearing pressure of said gate sealing member so that said gate sealing member can seat against the valve sealing seat only an amount sufficient to prevent leakage of fluid through the joint between the gate sealing member and the valve sealing seat and thereby transfer the load to the gate and its bearings.

2. A valve of the character described comprising a casing having a cavity therein, a waterway extending through the casing and intersecting the cavity, a sealing seat at the inner end of the waterway at the intersection of the waterway with the cavity, a gate within the cavity for controlling communication through the valve, said gate having upper and lower shafts mounted in bearings in the valve whereby said gate is rotatable on an axis at right angles with respect to the waterway of said valve, a movable sealing member on said gate and having a sealing surface for engagement with the valve casing sealing seat when said gate is rotated to position the movable sealing member in registration with the inner end of the valve waterway, means operable by variations in fluid pressure within the valve for moving the gate sealing member outwardly with respect to the gate and into tight seating engagement with the sealing seat at the inner end of the valve waterway, and means on said gate and accessible through the valve waterway when the gate is in closed position for lowering the seat bearing pressure of said gate sealing member so that said gate sealing member can seat against the valve sealing seat only an amount sufficient to prevent leakage of fluid through the joint between the gate sealing member and the valve sealing seat and thereby transfer the load to the gate and its bearings.

3. In a valve structure, the combination of a valve casing having a passage therethrough and a valve sealing seat, a ported valve element within said casing supported in bearings carried by the casing for movement to open and to close said passage; means carried by said valve element cooperating with said valve sealing seat when said valve element is in passage closing position for sealing the joint between said valve element and said casing, means operable by fluid pressure within the valve when the valve element is in passage closing position for urging the valve element sealing means into tight seating engagement with the valve sealing seat of said casing, and means on said valve element and accessible through the valve passage when the valve element is in passage closing position for lowering the seat bearing pressure of said valve element sealing means so that said valve element sealing means can seat against the valve sealing seat only an amount sufficient to prevent leakage of fluid through the joint between the valve element sealing means and the valve sealing seat.

4. In a valve structure, the combination of a valve casing having a passage therethrough and a valve sealing seat, a ported valve element within said casing supported in bearings carried by the casing for movement to open and to close said passage, means carried by said valve element cooperating with said valve sealing seat when said valve element is in passage closing position for sealing the joint between said valve element and said casing, means for urging the valve element sealing means into tight seating engagement with the valve sealing seat of said casing when the valve element is in passage closing position, and means on said valve element and accessible through the valve passage when the valve element is in closed position for lowering the seat bearing pressure of said valve element sealing means so that said valve element sealing means can seat against the valve sealing seat only an amount sufficient to prevent leakage of fluid through the joint between the valve element sealing means and the valve sealing seat and thereby transfer the load to the valve element and its bearings.

References Cited in the file of this patent

UNITED STATES PATENTS

| | | |
|---|---|---|
| 1,554,759 | Powell | Sept. 22, 1925 |
| 1,569,285 | Katona | Jan. 12, 1926 |
| 1,597,456 | Minard | Aug. 24, 1926 |
| 1,760,951 | Manifold | June 3, 1930 |
| 2,611,577 | Grant | Sept. 23, 1952 |
| 2,663,538 | Bacchi | Dec. 22, 1953 |
| 2,791,396 | Reppert | May 7, 1957 |

FOREIGN PATENTS

| | | |
|---|---|---|
| 546,624 | Germany | Mar. 22, 1932 |